April 19, 1932.   H. BROECKMEYER   1,855,125
AUTOMATIC PHONOGRAPH RECORD REVERSER
Filed Aug. 29, 1928   7 Sheets-Sheet 1

WITNESSES

INVENTOR
Harry Broeckmeyer
BY
ATTORNEY

April 19, 1932.   H. BROECKMEYER   1,855,125
AUTOMATIC PHONOGRAPH RECORD REVERSER
Filed Aug. 29, 1928   7 Sheets-Sheet 4

INVENTOR
Harry Broeckmeyer
BY
ATTORNEY

April 19, 1932.  H. BROECKMEYER  1,855,125
AUTOMATIC PHONOGRAPH RECORD REVERSER
Filed Aug. 29, 1928   7 Sheets-Sheet 7

INVENTOR
Harry Broeckmeyer
BY
ATTORNEY

Patented Apr. 19, 1932

1,855,125

UNITED STATES PATENT OFFICE

HARRY BROECKMEYER, OF NEW YORK, N. Y.

AUTOMATIC PHONOGRAPH RECORD REVERSER

Application filed August 29, 1928. Serial No. 302,817.

This invention relates to phonographs.

It is among the objects of the invention to provide an improved phonograph mechanism, whereby the records may be automatically moved to present the opposite face to the sound box.

It is a further object of the invention to provide means whereby the position of the sound box initiates movement of associated apparatus, whereby the record may be turned when the sound box has reached the end of the record.

Another object of the invention is to provide an improved record-gripping construction which includes a pair of arms provided with hinged joints, whereby the arms may be accommodated for use with either the conventional ten, or the conventional twelve-inch record.

Other objects of the invention include the provision of a simple efficient structure which will be automatically operative and which will positively act to accomplish the desired end. Additional objects relate to the combination and interrelation of parts; the whole forming a unique apparatus supplying a long felt demand.

In considering the invention herein disclosed, it is understood that the particular embodiment of the invention described and shown in the drawings constitutes only one form of the present invention. Numerous changes and modifications may be used, and the full use of mechanical equivalents throughout may be resorted to without departing from the spirit or scope of the present invention.

Attention is directed to the accompanying specification and drawings, in which—

Figures 5, 6:
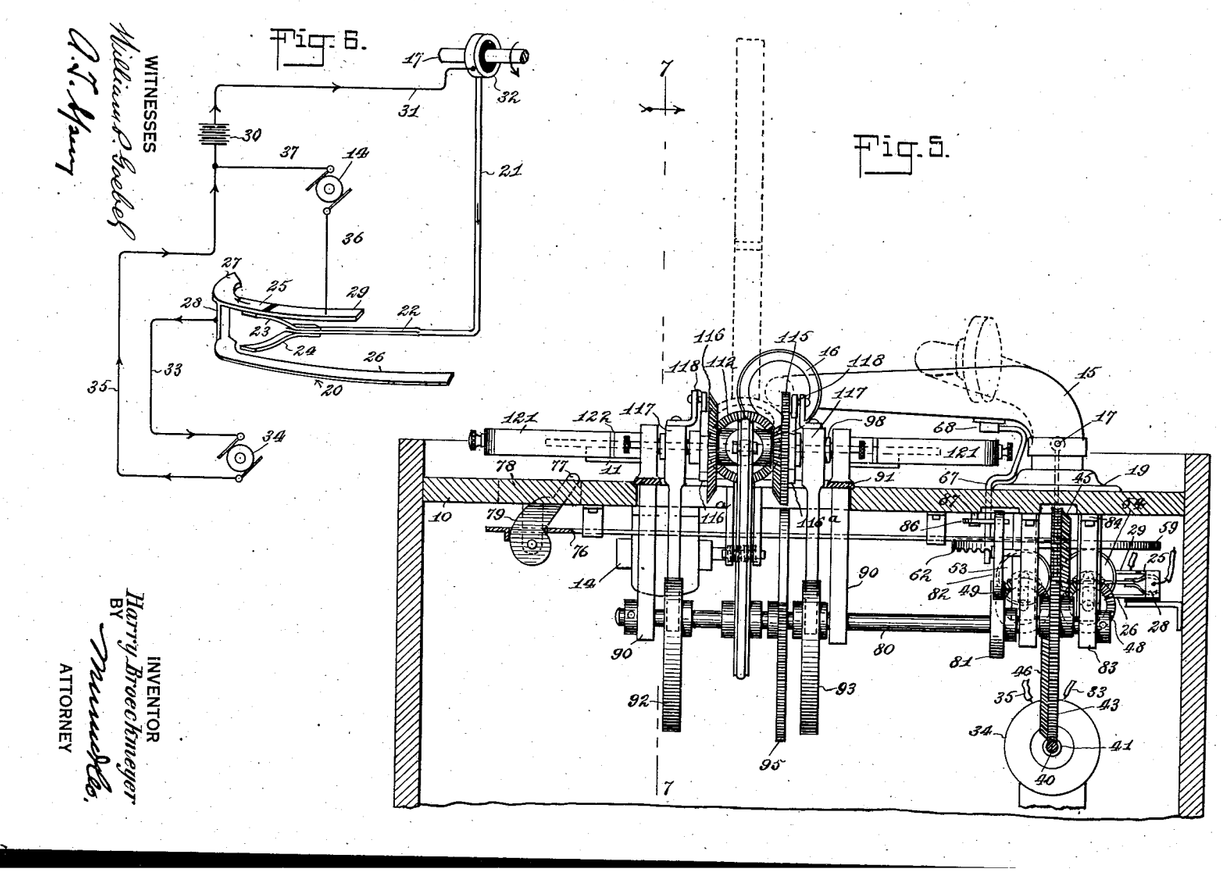
Fig. 5 is an end elevation with the cabinet shown in section.
Fig. 6 is a diagrammatic illustration of an electrical wiring switch associated with my invention.

Referring more particularly to the drawings, a supporting motor board and associated cabinet is illustrated at 10 and more clearly seen in Fig. 5. The usual horizontally rotatable turntable 11 is provided, and rotated by a central vertical shaft 12 which is preferably turned by a suitable electrical motor 14. The usual tone arm 15 and sound box 16 are provided mounted through the motor board 10, the tone arm 15 being pivoted for vertical movement about a horizontal axis 17, and being rotatable by rotation of the tubular sound conducting sleeve 18 to which it is pivoted. A suitable escutcheon plate 19 may be provided for securing the sleeve 18 in proper relation with the motor board 10.

Mounted for actuation by movement of the tone arm 15, there is provided a control switch 20. The switch includes a vertical operating link 21 terminating in a horizontal arm 22, the end of which is bifurcated to provide upper and lower contact members 23 and 24 respectively. The upper contact member 23 is adapted upon positioning of the sound box 16 upon a sound record to engage by sliding contact an upper split contact surface 25, while the lower contact member 24 is adapted upon raising of the sound box 16 to engage a lower contact surface 26.

By referring to Fig. 5 it will be noted that one end 27 of the upper contact 25 is joined for electrical connection with the lower contact surface 26 by a conducting bar 28, while the opposite end 29 of the surface 25 is insulated from the end 27.

As illustrated in Fig. 6, any suitable source of electrical energy may be supplied as at 30. With the arm 22 in the position shown in Fig. 6, current is supplied from the source of potential 30 through conductor 31 and the slip ring connection 32, through the vertical link 21, arm 22 and the upper contact member 23 to the end 27 of the upper contact surface 25; thence through the conducting member 28, conductor 33 to supply energy for rotating a suitable electrical motor 34. The circuit is completed from the motor 34 to the source of potential 30 through the conductor 35. As will be hereinafter described, the motor 34 is adapted to control the movement of the tone arm lifter and record-reversing mechanism. After consideration of this mechanism it will be noted that after reversing the record and lowering of the sound box 16 upon the outer periphery of the sound record, the contact member 23 will engage the end 29 of the upper contact surface 25; thus, breaking the electrical circuit through the motor 34 and completing the electrical circuit in the source of potential 30 through conductor 31, slip ring 32, link 21, arm 22, end 29 and conductors 36 and 37 through the electrical motor 14 which is adapted for connection with the shaft 12 for rotating the turntable.

It may be readily seen that as the sound box 16 moves toward the center of the record, and the end of the sound groove, it approaches the end 27 of the upper surface 25, thus breaking the circuit to the motor 14 and initiating movement of the motor 34, upon the energization of which the sound box is lifted as will hereinafter be described, causing the lower contact member 24 to engage the lower contact surface 26, thus maintaining the circuit through the motor 34 until such time as the sound box is lowered upon the sound record near its periphery, whereupon the circuit will be broken and the circuit to the motor 14 will be completed as hereinbefore described.

It will be understood that the specific form of switch herein disclosed and the circuit connections and power supply for operating the turntable and the changing mechanism may assume various changes and modifications without departing from the spirit or scope of the present invention. The full use of equivalents may be resorted to which includes the provision of mechanical equivalents in place of the electrical switch circuit and motors herein described.

Figures 3, 4:
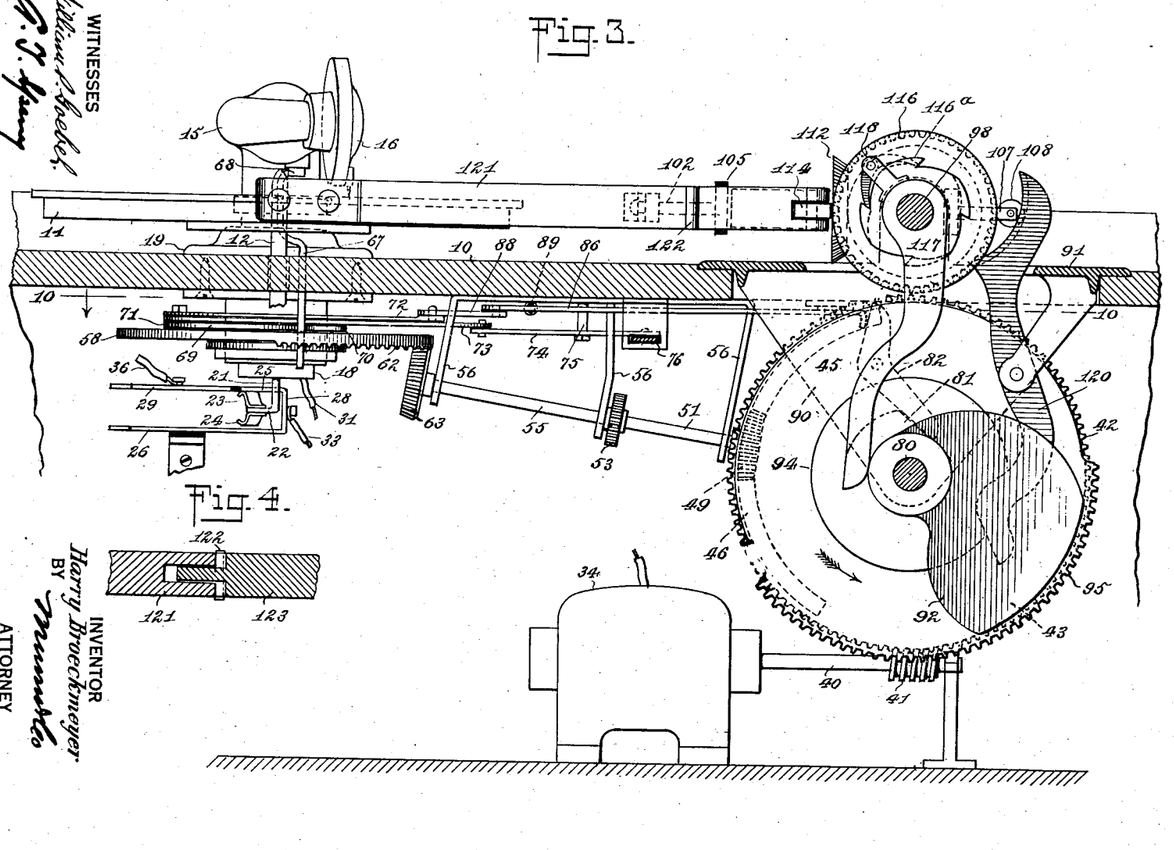
Fig. 3 is a sectional view taken on the lines 3—3 of Fig. 1.
Fig. 4 is a detail sectional view of the arm hinge connection taken on the lines 4—4 of Fig. 1.
Figure 7:
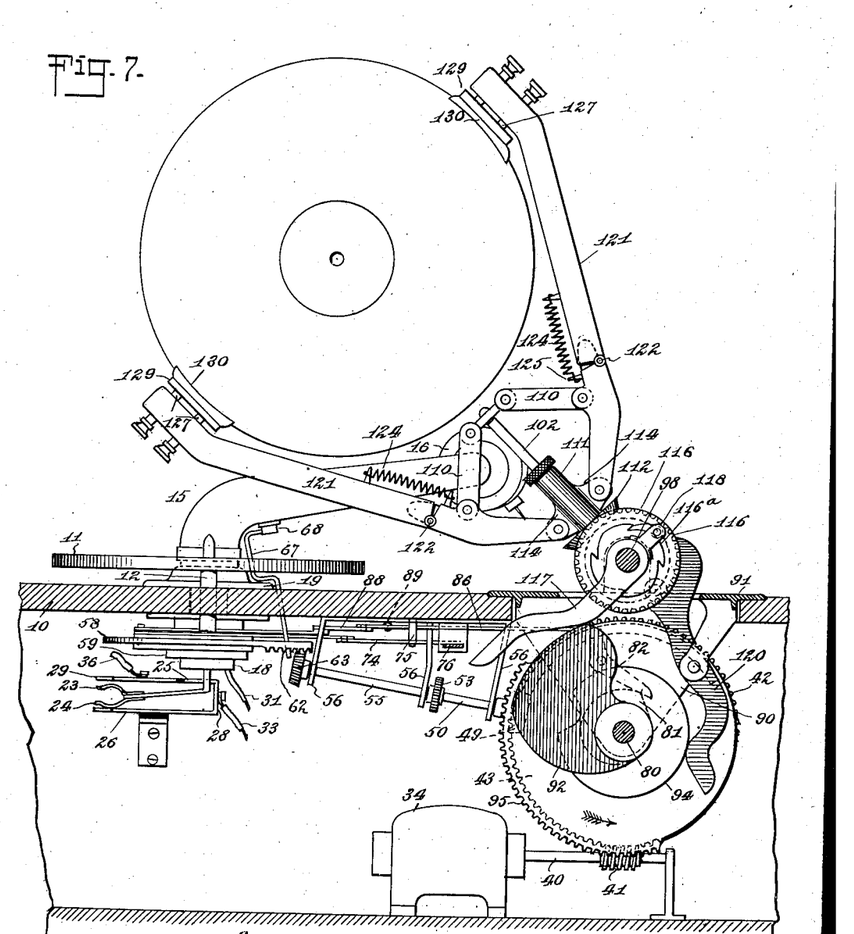
Fig. 7 is a sectional view taken on the line 7—7 of Fig. 5, illustrating the record in vertical position.

For operating the tone arm lifting and record reversing mechanism, it will be noted by referring to Figs. 3 and 7 that the motor 34 is provided with a shaft 40 upon which is mounted a worm gear 41 adapted to engage the peripheral edge teeth 42 of a main driving gear 43. By referring to Figs. 10 and 12 it will be noted that the gear 43 is provided on either side with segmental bevelled gears 45 and 46. Each of the bevelled gears 45 and 46 extend a distance of approximately one-sixth of the circumference of the wheel 43; their terminating ends being adjacent on opposite sides of the wheel. Mounted on either side of the main driving gear 43 and to mesh respectively with the bevelled gear segments 45 and 46 there is provided a pair of cooperatively bevelled gears 48 and 49. The cooperating gears 48 and 49 are carried upon inclined shafts 50 and 51, upon the opposite ends of which are mounted gears 52 and 53 for rotation with the cooperating gears 48 and 49 respectively. The gears 52 and 53 are both in mesh with a gear 54 carried upon the extremity and adapted to rotate a shaft 55 similarly inclined to the shafts 50 and 51. The shafts 50, 51 and 55 are suitably mounted for rotation in brackets 56 which may be suspended from the motor board 10 in any desired manner.

Figures 10, 11:
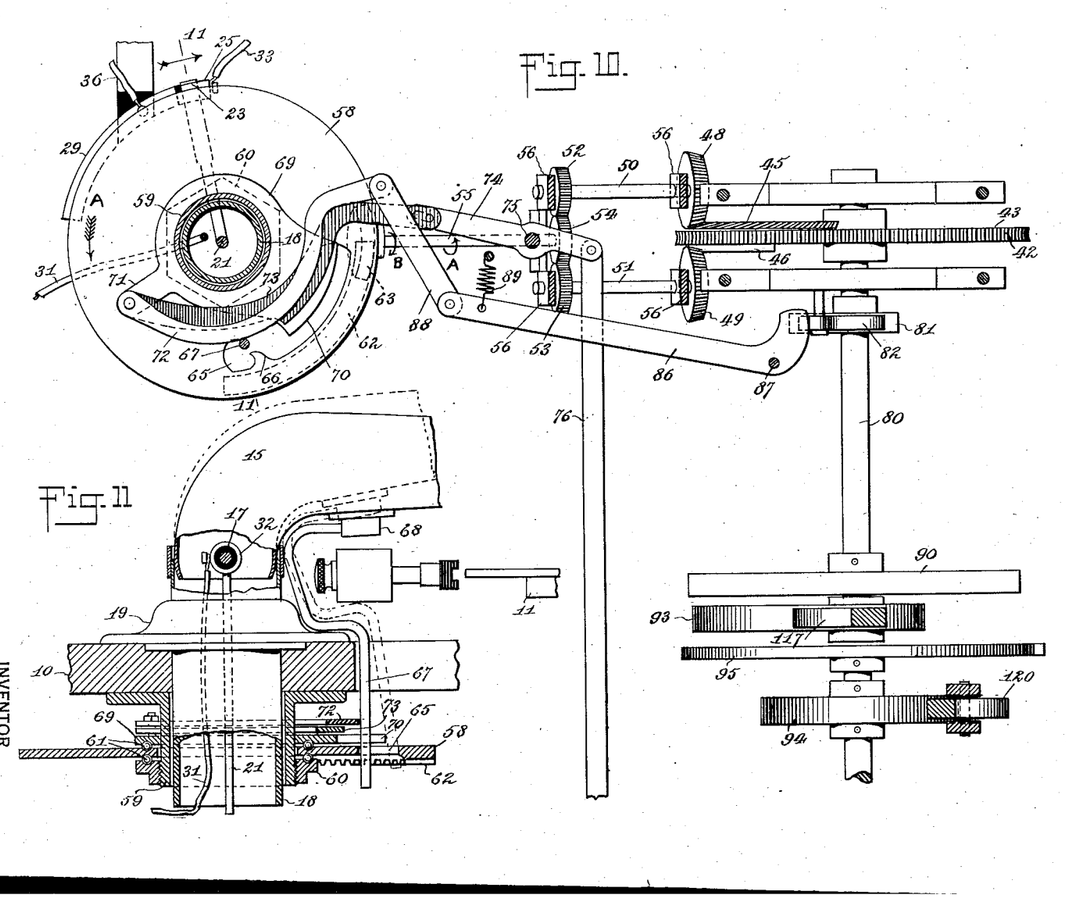
Fig. 10 is a horizontal section taken on the lines 10—10 of Fig. 3, showing the relation of the parts when the tone arm has reached the end of the record.
Fig. 11 is a view partly in section taken through lines 11—11 of Fig. 10.

It will be understood that the neutral position of the tone arm lifting and swinging mechanism is the position of the wheel 43 where the cooperating gears 48 and 49 are at the adjacent ends of the bevelled gear segments 45 and 46; thus, it may be seen that upon counter-clockwise rotation from the neutral position of the gear 43, the segment 45 will cooperate with the gear 48 to cause rotation of the shaft 50, gear 52 and gear 54, whereby the shaft 55 will be rotated in the direction of the arrow A, and thus rotate the flange 58 in the direction of its arrow A, as shown in Fig. 10.

When the end of the segment 45 has reached the gear 48, it will be seen that the wheel 43 is free to move through approximately two-thirds of a revolution, at which time the bevelled segment 46 enmeshes with the gear 49, turning it with the shaft 50 and gear 53, whereby the shaft 55 will be rotated in a direction opposite to that previously pointed out as indicated by the arrow B.

For moving the tone arm 15 from its position at the end of the record sound groove, there is provided a flange 58 as seen in Fig. 11, loosely mounted about a collar 59 carried by the motor board 10; an internally threaded member 60 being provided at the end of the collar 59 for securing the flange 58 in rotatable relation to the collar 59, suitable bearings 61 being provided. A portion of the under side adjacent the edge of the flange 58 is provided with teeth forming a rack 62 which is adapted to enmesh with a gear 63 carried upon and rotatable by the shaft 55; thus, rotational movement of the flange 58 is provided for, the movement being on looking downward upon the flange counter-clockwise upon initial movement in response to the bevelled segment 45, and rotation of the shaft 55 is indicated by the arrow A as will be hereinafter described upon the completion of this counter-clockwise rotation as indicated by the arrow A on the flange 58. The flange 58 remains stationary until the rotation of the gear has advanced so far as to bring the segment 46 into engagement with the gear 49, whereupon clockwise movement of the flange 58 will follow by rotation of a shaft 55 in the direction of the arrow B (Fig. 10).

For actuating the tone arm 15 in response to movement of the flange 58, an arcuate aperture 65 is provided therein. One end of the aperture 65 is provided with an inwardly projecting extension 66. The aperture 65 is adapted to receive therethrough an operating lever arm 67 secured to the tone arm 15 in any desired manner as shown at 68. The lever arm 67 is preferably turned inwardly to conform to the shape of the tone arm 15, and thus providing for the movement of the record gripping means which will be hereinafter described. Fixedly mounted upon the collar 59 there is provided a stationary plate 69 provided with an extending camming edge 70 which is adapted to partially overlie the arcuate aperture 65. An extending arm 71 is also provided upon the plate 69 to which there is pivoted upper and lower cam faced levers 72 and 73 respectively. The lower lever 73 is adapted for setting by actuation of a pivoted link 74 pivoted upon an axis 75 depending from the motor board 10. The link 74 is operated by a draw bar 76 extending under the motor board 10 as illustrated in the dotted lines in Fig. 1, and being operable by a camming lever 77 extending through the motor board as at 78 and pivoted to the under side thereof at 79 as shown in Fig. 5. As will be hereinafter pointed out the actuation of the camming lever 77 is adapted to control the amplitude of motion of the tone arm 15 for conforming the operation of the device to various sizes of sound records.

Figure 12:
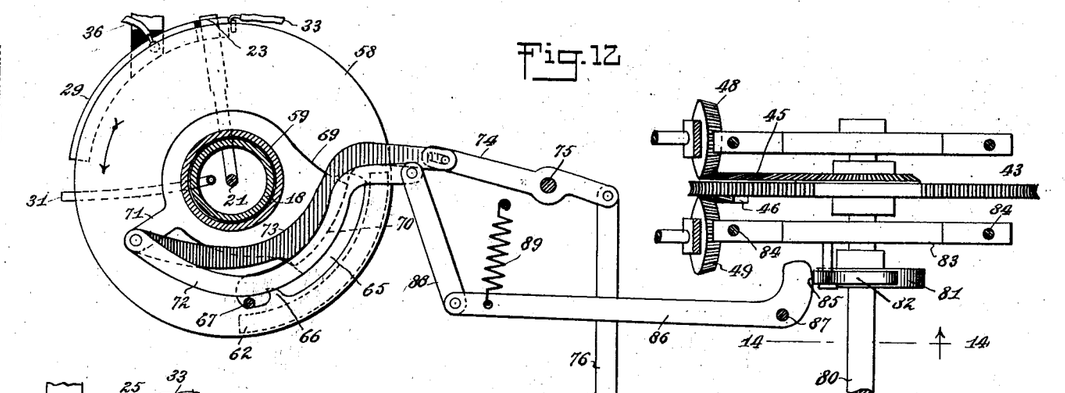
Fig. 12 is a section similar to Fig. 10 showing the position of the parts when the tone arm has been raised and is moving toward the periphery of the record.
Figure 14:
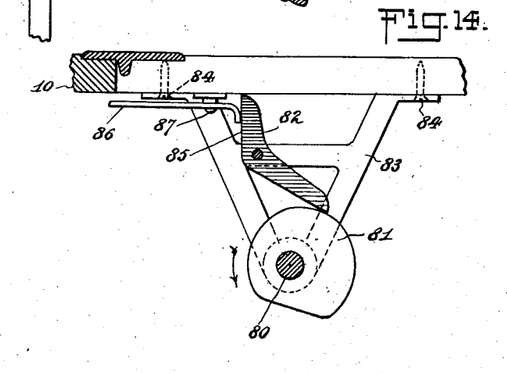
Fig. 14 is a sectional view taken on the lines 14—14 of Fig. 12.

By referring to Figs. 12 and 14 it will be noted that the upper cam faced lever 72 is movable about its pivot point by the rotation of the main drive shaft 80 to which the main driving gear 43 is fixed for rotation therewith. A rotating cam 81 is provided upon the shaft 80 adjacent the gear 43, and a bell crank 82 is provided pivoted to one of the main shaft support bearings 83 which are adapted to extend downwardly through the motor board 10 to which they are secured as at 84.

Referring to Figs. 12 and 14, it will be seen that rotation of the shaft 80 in counter-clockwise direction will effect movement of the bell crank 82 about its pivot, whereby its upper face 85 contacts with a link 86 pivoted to the under side of the motor board 10 as at 87; thus, effecting linear motion of a connecting link 88 to which the free end of the link 86 is secured, and in turn causing pivoted movement of the upper cam faced lever 72. It has been found preferable to provide a contracting spring 89 between the motor board 10 and shaft 87, whereby the shaft will be normally held in spring urged abutting relation to the surface 85 of the bell crank 82.

In the operation of the tone arm lifting and moving mechanism, it may be seen that as the motor 34 is energized by the operation of the switch 20 previously described, the main drive gear 43 is rotated in a counter-clockwise direction from its vertical position shown in Figs. 10 and 12, thus bringing in contact with the cooperating bevelled gear 48 the bevelled gear segment 45, whereby the shaft 55 is rotated in the direction of the arrow A, and causing a counter-clockwise rotation of the flange 58 as indicated by arrow A thereon. Simultaneous with the beginning of the counter-clockwise motion of the flange 58, the cam 81 is rotated in a clockwise direction; thus, moving the bell crank 82 in a counter-clockwise direction about its pivot, and causing its face 85 to cam outwardly the abutting face of the link 86, whereby it rotates in a counter-clockwise direction about its pivot 87, thus moving through the connecting link 88 the upper cam faced lever 72 outwardly from the sleeve 59, and forcing the lever arm 67 of the tone arm 15 against the outer side of the aperture 65, whereby the tone arm is rotated about its axis 17; thus raising the sound box 16 from the record groove. The rotation of the flange 58 causes the lever arm 67 to be caught by the extension 66 and to be moved out of position above the record, whereby the record may be raised and turned over as will be hereinafter described; the mechanism thus assuming the position indicated in Fig. 15 of the drawings, this movement having occurred by one-sixth of a revolution of the main driving gear 43.

Upon completion of the counter-clockwise rotation of the flange 58 by completion of the rotation of the gear 48 by the segment bevel 45, it will be seen that the gear 43 is free to travel for two-thirds of a revolution before reverse rotation of the flange 58 is initiated by cooperation of the bevelled gear 46 and gear 49, and the rotation of the shaft 55 in the direction of the arrow B. It will be seen that during this interim of two-thirds of a revolution, the tone arm remains in its removed position from above the turntable. By referring to the configuration of the cam 81, it will be noted that during this two-thirds revolution of the gear wheel 43, and thus of the shaft 80 to which it is secured, it will be noted that the camming face 85 of the bell crank 82 is maintained in extended position holding lever 87 against the tension of the spring 89 in a position whereby the lever 72 will maintain the tone arm in the upwardly swung position about its axis 17, thus securing the sound box in the raised position as shown in Fig. 7.

Figure 13:
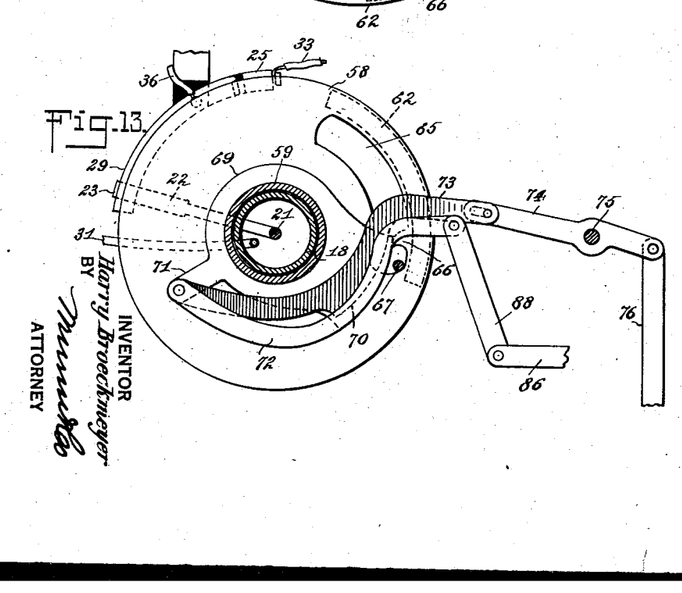
Fig. 13 is a view similar to Fig. 12, wherein the tone arm has reached the end of its outward movement.

Upon completion of the two-thirds free revolution of the wheel 43, during which time the record has been lifted and turned over as will be hereinafter described, the clockwise motion of the flange 58 is initiated. It may be readily seen that at this point the mechanism has taken on the position shown in Fig. 13, thus, clockwise direction of the flange 58 causes the extension 66 to engage the arm 67 and thus move the tone arm back over the turntable. The bell crank 82 has thus reached the position upon the cam 81 where it is free to assume its mounted position and the spring 89 thus draws the lever 87, whereby the arm 72 will move about its pivot and assume a position adjacent the collar 59. The downward movement of the tone arm and sound box is however arrested by the camming surface 70 of the fixed plate 69, and thus continuing the engagement of the arm 67 by the projection 66 until such time as the arm 67 has reached by a clockwise travel the end of the camming face. When this is accomplished the arm 67 moves inwardly towards the vertical axis of the flange 58, thereby lowering the sound box upon the outer periphery of the sound record. Continued rotation in a clockwise direction of the flange 58 will not effect movement of the tone arm as the length of the aperture 65 is such as to provide a lost motion connection.

By referring to the switch mechanism, it will be seen that upon lowering the tone arm, the switch is operated to cut off power from the motor 34 and initiate the motor 14, thus the tone arm is moved and is free to move across the record, reproducing sound waves in the usual manner; the motor 34 having been stopped at the neutral position of the gear wheel 43.

Figure 15:
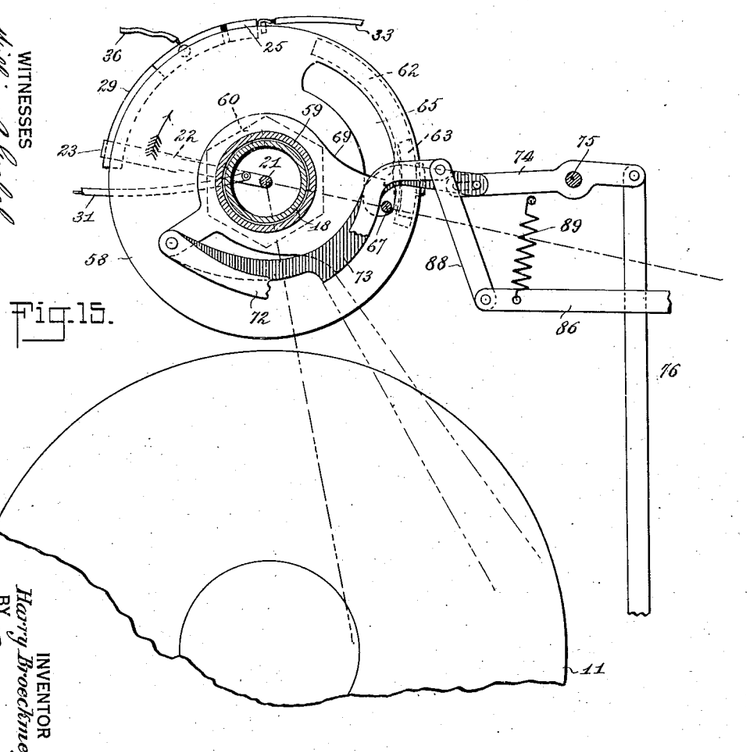
Fig. 15 is a sectional view similar to Figs. 12 and 13 illustrating the movement of the various parts to conform to the size of the record being used.
Figure 16:
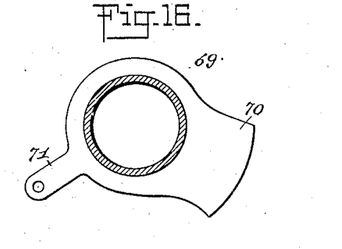
Fig. 16 is a detail view of a stationary cam for guiding the tone arm movement.
Figure 17:
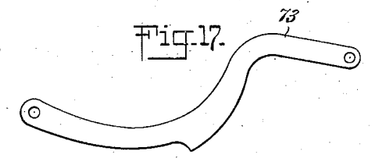
Fig. 17 is a detail view of a pivoted cam for guiding the tone arm movement when used in connection with small records.
Figure 18:
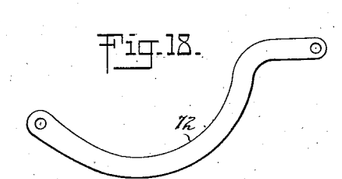
Fig. 18 is the tone arm raising and lowering lever.

By referring to Figs. 15 and 17, it will be seen that movement of the draw bar 76 causing rotation of the pivoted link 74 about its pivot 75, causing the lower cam faced lever 73 to move outwardly from the collar 59, will bring its cam surface in a position to overlie the cam face 70 of the fixed cam 69, whereby inward swinging movement of the tone arm will be caused to continue beyond that previously described in connection with the movement of the arms 67 over the cam face 70. Thus, when it is desired to operate the device for small diameter records, the draw bar 76 is moved to the position shown in Fig. 15; the difference between the lowering points of the tone arm being indicated by the dotted lines.

For operating the record reversing mechanism, the shaft 80 extends transversely under the motor board 10; the end opposite the driving gear 43 being journalled in a pair of spaced supporting members 90 which are carried from a plate 91 which is adapted to fit over an aperture in the motor board 10. Mounted between the members 90, a shaft 80 carries a pair of cams 92 and 93 rotatable therewith, midway between which a cam wheel 94 is provided and a mutilated gear 95 is mounted between the cam wheel 94 and the cam 93; all of these members being secured to the shaft 80 for rotation therewith.

Figure 2:
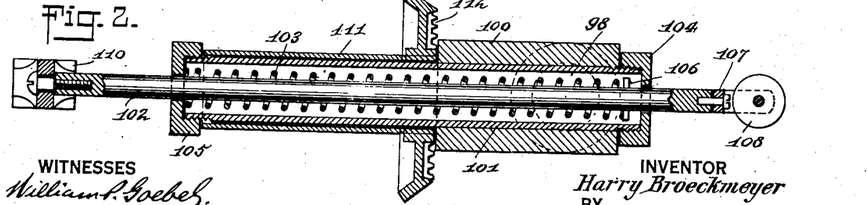
Fig. 2 is a sectional view taken on lines 2—2 of Fig. 1.

The supporting members 90 are adapted to extend above the surface of the motor board 10. Between their upwardly extending extremities there is provided a shaft 98 journalled upon adjustable screws 99 carried through the upward extensions of the supports 90. The shaft 98 includes a substantially T-shaped collar 100 centrally apertured through the stem of the T as shown in Fig. 2. Within the collar 100 and projecting therefrom in the direction of the stem of the T there is provided a liner 101 within which a push rod 102 is provided surrounded by an expansion spring 103. The collar end of the liner 101 may be preferably closed by a threaded cap 104 which is apertured to provide a bearing for the push rod 102. The opposite end of the liner may also be closed with a cap 105, also apertured to form a bearing for the push rod 102. It will be noted that the expansion spring 103 abuts the inner face of the cap 105 at one end, while the opposite end is adapted to bear against a cross pin 106 extending through the push rod. The collar end of the push rod 102 is preferably provided with a bifurcated extension 107 between the bifurcations of which a suitable collar 108 may be provided. The opposite end of the push rod 102 is secured to a pair of arm operating links 110, the operation of which will be hereinafter described. Surrounding that portion of the liner 101 which extends out from the collar 100, a rotating sleeve 111 is provided, upon the inner end of which a bevelled gear 112 is secured for rotation with the sleeve 111. Extending from diametrically opposite points on the sides of the sleeve 111 ears 114 are provided to which arm pieces may be pivoted as will be understood from the further description of the apparatus.

Mounted on either side of the collar 100 upon the shaft 98, a fully rotatable mutilated bevelled gear 115 is provided, and on the other side of the collar 100 a complete bevelled gear 116 also fully rotatable with the shaft 98 is also provided. Mounted between the supporting member 90 and the gears 115 and 116 a pair of ratchet wheels 115a and 116a respectively are provided, and are part of the gears 115 and 116 respectively. Levers 117 are provided mounted securely on the shaft 98, their upper ends being provided with oppositely disposed pivoted pawls 118 which are adapted for cooperation with the opposite inclination of the ratchets 115a and 116a.

Figure 1:
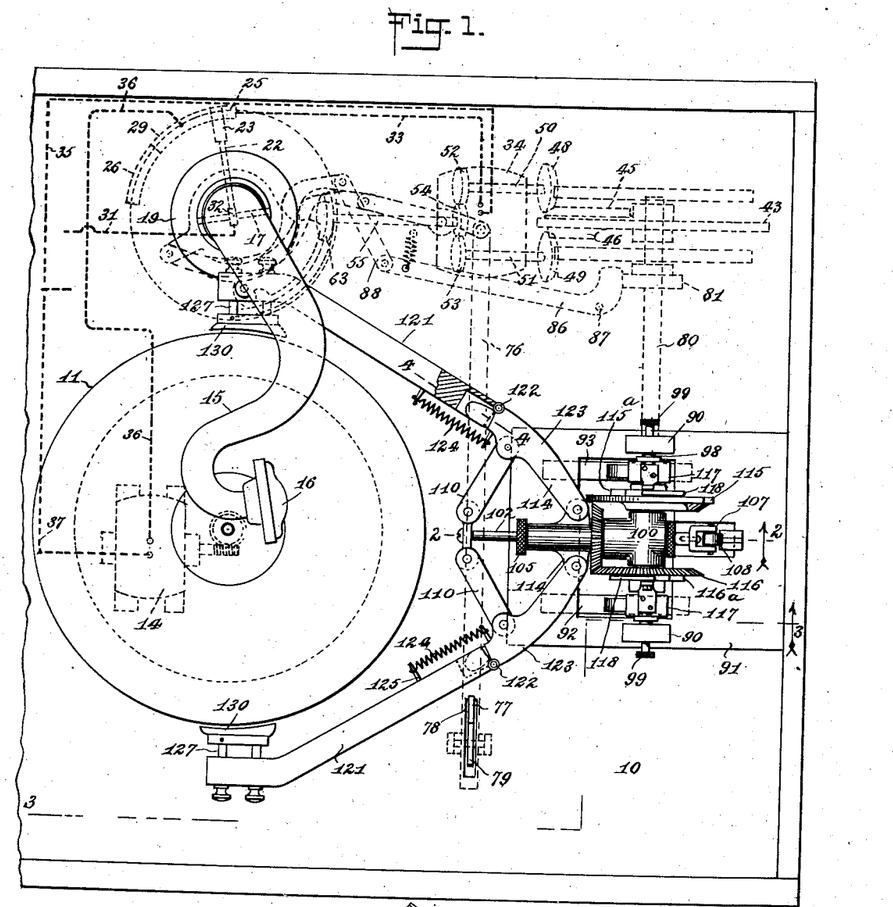
Fig. 1 is a top plan view of an apparatus embodying my present invention.

For causing longitudinal motion of the push rod 102 the cam wheel 94 is provided which is adapted to move about its pivot a gripping lever 120 which bears upon the wheel 108, thus upon inward movement, causing linear motion of the push rod 102 against the tension of the spring 103. For gripping the record and lifting it from the turntable, there is provided a pair of hinged arms 121 hinged as at 122 by the provision of a bifurcated end and extending tongue, the interrelation of which is clearly illustrated in Fig. 4. The short hinged extension 123 of the arms 121 is pivoted in the ears 114 of the sleeve 111 as seen in Fig. 1. Movement about the pivot point of the ears 114 being controlled by the arm-operating links 110 associated with the extremity of the push rod 102.

At the hinged connection of the arms 121 with the extensions 123, contracting springs 124 are provided which may be preferably joined to the respective members by protruding pins 125.

Figure 8:
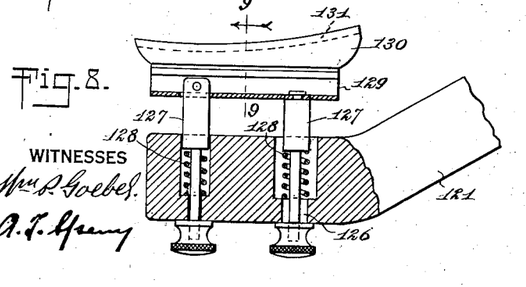
Fig. 8 is a detail view partly in section of the record gripping means.
Figure 9:
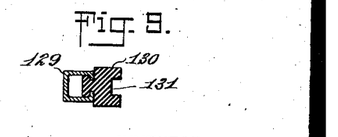
Fig. 9 is a detail sectional view taken on the lines 9—9 of Fig. 8.

The extremities of the arm 121 are provided with record gripping means illustrated in detail in Figs. 8 and 9; the extremities of the arms being apertured as at 126 to receive therethrough a pair of supporting members 127 urged outwardly from the arms 121 by springs 128. The inner supporting member 127 is preferably rigidly secured to the gripping base 129 while the outer member 127 is pivoted thereto, the base 129 may preferably be substantially U-shaped in cross section, its free end gripping therebetween a resilient pad 130 which may be bifurcated to form a recess 131 within which the record is adapted to fit. The pad 130 may preferably be formed of rubber, felt or other suitable material. It will be noted that by the pivot connection of the outer supporting member 127, together with the enlargement of the aperture 126 for the inner support 127, that controlled and dampened play of the pad 130 may take place, thereby insuring proper gripping for various record edges. It will be further noted that by the hinged structure of the arms 121, that they may be bent outwardly to accommodate the reception of various sizes of phonograph records.

The operation of the record elevating and turning mechanism may be described as follows. When the end of the bevelled segment 45 has reached the gear 48, as previously discussed, the tone arm and sound box have been moved to the position indicated by a dotted line in Fig. 15, whereby they are in a position leaving the record free to be lifted and turned. It will be remembered that by the configuration of the segmental gears 45 and 46 that a two-thirds revolution of the gear 43 may take place before the tone arm is returned to a position over the record.

Referring now the Figs. 3, 5 and 7, it will be noted that the depression of the cam wheel 94 is such that immediately the drive gear 43 is rotated in a counter-clockwise direction, the gripping lever 120 will be moved outwardly from the shaft 80; thus, moving toward the turntable, the push rod 102 against the tension of the spring 103 by connection of the upper cam surface of the lever 120 with the wheel 108 and held in this position until the end of a full revolution of the shaft 80 when lever 120 will slide into the notch of the cam wheel 94. By referring to Fig. 1 it will be noted that this rectilinear motion inwardly of the push rod 102 moves inwardly the arm-operating links 110, and it may be readily seen that such movement will cause a contraction of the arms 121 moving the record-gripping means toward each other by pivotal movement of the arms 121 with respect to the ears 114. In this connection it will be noted that if the record is of large diameter as shown by the full lines in Fig. 1, the record will be received within the recess 131 and further inward movement caused by the links 110 will effect a hinged movement at the point 122 against the tension of the springs 124. On the other hand, should the record be small as shown by the dotted lines in Fig. 1, the continued movement of the arms 121 inwardly will grip the edge of the record without causing hinged motion of the arms 121; thus, the arms automatically compensate for varying sizes of records, and in each instance regardless of size, the arms move inwardly, receiving the record within the recess of the pad 130, and by the springs associated with the supporting members 127, the record will be gripped and firmly held by the arms 121, and so held until the expiration of one full rotation of the gear 43 until the lever 120 slips into the notch of cam 94.

Note that the configuration of the similar cams 92 and 93 is such that they will rotate freely about one-fifth of the rotation of the drive gear 43. By further advancing said cams, they will strike levers 117 causing upward movement towards the turntable, being securely fastened on shaft 98; 98 being part of the T-shaped bushing 100. It will be seen that further movement of cams 92 and 93 will cause raising of the arms 121 to lift the record.

The gear 116 is free to rotate about the shaft, its action being merely to retain in proper alignment the bevel gear 112. It will be also noted that the pawl engageable with the ratchet 116a is free to slip over the ratchets. When the cams 92 and 93 have moved the arms 117 to the furthest extended position, they will retain the cams in this position for approximately one-third of the rotation of the gear 43, as will be seen by reference to the configuration of the camming surface.

During the period of elevated raised position of the lifting arms, when the levers 117 are held outwardly by the curved surface of the cam 92 and 93, it will be readily seen that the mutilated gear 95 is moved to engage the peripheral gear teeth of the mutilated gear 115; thus, rotating the mutilated gear 115 about the shaft 98, whereby its mutilated bevelled gear teeth will engage the gear 112 and rotate it with the sleeve 111 about the liner 101; thus, by the push rod swivel connection of the ears 114, it will be seen that the record is rotated about a diametrically extending axis in line with the push rod 102.

It will be readily understood that the gearing ratios and mechanical movement coordination is such that the record will be rotated one-half of a revolution. Continued motion of the drive shaft 80 thus causes the gear teeth of the gear 112 to pass from the teeth of the mutilated gear 115, whereby rotation is ceased, and shortly thereafter the camming surfaces are moved to permit the arms 117 to assume their normal position, thus lowering the record carrying arms to replace the record upon the turntable with its reverse side uppermost.

The above movements of lifting, turning and replacing having been accomplished in the two-thirds rotation of the gear 43, it will be understood, referring to the operation of the tone arm, that at the termination of this free two-thirds rotation of the gear 43, the tone arm is moved inwardly and lowered upon the peripheral edge of the surface of the record.

The coordination of the various movements will be readily understood. Commencing with the sound box at the expiration of the sound groove of the record as previously described, the energy to the motor 14 is cut off while the motor 34 is energized. Thus, the shaft 80 through actuation by the gear 43 is caused to rotate from the neutral position of the segmental gears. The tone arm is then raised and removed to a point away from the upper surface of a sound record, and is maintained in that position while the record arms move inwardly to grip the record and then raise the record and reverse it; and moving downwardly to deposit the reversed record upon the turntable. The push rod is then allowed to move inwardly to release the record, and upon completion of this movement which has so far consumed five-sixths of the revolution of the shaft 80, the opposite segmental gear comes into play, returning the tone arm to a position above the record and positioning the sound box on the outer peripheral edge of the record, whereupon the switch mechanism acts to cut off power to the motor 34 and initiate movement of the motor 14 as substantially herein described.

Thus, it may be seen that my invention provides a completed automatic mechanism, whereby opposite sides of a record may be played without any manual manipulation of the apparatus. The operation of the device is continuous and opposite sides of the record may be successively played for any desired period of time without requiring any attention from the operator of the mechanism.

In considering the invention as herein described, illustrated and claimed, it is to be distinctly understood that in all portions of the apparatus, modifications and changes may be used, and the full use of equivalents resorted to without departing from the spirit or scope of the present invention. The particular configuration of parts and interrelation of such specific parts is not deemed to be the invention; the invention being the provision of interrelating means for synchronized movement to accomplish the end desired, and herein pointed out as the objects of the invention.

What is claimed is:

1. In a device of the character described, a tone-arm lifting and moving mechanism, a record-reversing mechanism, a single drive shaft, segmental bevelled gears carried by said shaft for actuating said lifting and moving mechanism and cams carried by said shaft for actuating said record reversing mechanism.

2. In a device of the character described, a tone-arm lifting and moving mechanism, a record-reversing mechanism, a single drive shaft, segmental bevelled gears carried by said shaft for actuating said lifting and moving mechanism and cams carried by said shaft for actuating said record reversing mechanism, said cams being adapted for actuation between actuation of said tone arm raising and moving mechanism in response to said segmental gears.

3. In a device of the character described, a tone arm moving mechanism comprising a pair of segmental bevelled gears, driving means associated with said gears for turning said tone arm in opposite directions in response to uni-directional movement of said segmental gears.

4. In a device of the character described, a tone arm lifting and moving mechanism including a pair of segmental bevelled gears and a cam rotatable therewith, means for moving said tone arm in opposite directions in response to uni-directional movement of said bevelled gears and means for raising and lowering said tone arm in response to movement of said cam.

5. In a device of the character described, a pair of record gripping arms, a cam for controlling inward and outward movement of said arms, a pair of cams for raising and lowering said arms and a mutilated gear adapted to rotate said arms while they are in raised position.

6. In a device of the character described, a record actuating mechanism including a rotatable sleeve, a pair of pivoted record-engaging arms carried thereby, and actuating links carried by said arms for controlling pivotal movement thereof.

7. In a device of the character described, a record actuating mechanism including a rotatable sleeve, a pair of pivoted record-engaging arms carried thereby, actuating links carried by said arms for controlling pivotal movement thereof, and a longitudinally movable member within said sleeve and associated with said links for moving the same.

8. In a device of the character described, a tone arm and actuating mechanism therefor, including a rock shaft, a gear carried by said shaft, a plate including a rack section engageable with said gear, and an actuating member dependent from said tone arm and extending through said plate for actuation of said tone arm in response to rotation of said plate.

9. In a device of the character described, a tone arm and actuating mechanism therefor, including a rock shaft, a gear carried by said shaft, an apertured plate having a rack section engageable with said gear, and an actuating member dependent from said tone arm and extending through said plate for actuation of said tone arm in response to rotation of said plate, said plate having a projection extending within said aperture for securing the actuating member therebehind.

10. In a device of the character described, a tone arm and actuating mechanism therefor, including a rock shaft, a gear carried by said shaft, an apertured plate having a rack section engageable with said gear, an actuating member dependent from said tone arm and extending through said plate for actuation of said tone arm in response to rotation of said plate, said plate having a projection extending through said aperture for securing the actuating member therebehind, and pivoted members carried by said plate for movement to control the configuration of said aperture.

11. In a device of the character described, record reversing mechanism including a rotatable sleeve, jointed record-engaging arms pivotally connected with said sleeve, and a toggle connected with said arms operable to cause the pivotal movement of said arms.

12. In a device of the character described, record reversing mechanism including a rotatable sleeve, jointed record-engaging arms pivotally connected with said sleeve, and a toggle connected with said arms operable to cause the pivotal movement of said arms, said toggle including a spring actuated push rod which extends through said sleeve and a cam operated roller on the free end of said rod.

13. In a device of the character described, record reversing mechanism including a rotatable part, arms each pivotally connected at one end with said rotatable part, record engaging means on the free end of each of said arms, each of said arms consisting of hingedly connected spring actuated sections, and a toggle connected with said arms operable to cause the pivotal movement of said arms, to cause the engagement of said means with a record and the disengagement thereof from said record.

14. In a device of the character described, record reversing mechanism including relatively movable arms, and record engaging means on each of said arms consisting of a yieldingly and pivotally mounted record engaging member.

15. In a device of the character described, record reversing mechanism including a rotatable part, arms each pivotally connected at one end with said rotatable part, record engaging means on the free end of each of said arms, each of said arms consisting of hingedly connected spring actuated sections, and a toggle connected with said arms between their hinge connections and their pivotal connections with said rotatable part, operable to cause the pivotal movement of said arms, to cause the engagement of said means with a record and the disengagement thereof from said record.

HARRY BROECKMEYER.